United States Patent

[11] 3,621,257

[72] Inventors Phillip A. Johnston;
 Vincent L. Gelezunas, both of King of Prussia, Pa.
[21] Appl. No. 17,403
[22] Filed Mar. 9, 1970
[45] Patented Nov. 16, 1971
[73] Assignee The United States of America as represented by the United States Atomic Energy Commission

[54] BETA PARTICLE DETECTION IN THIN NUCLEAR DETECTORS
 5 Claims, 1 Drawing Fig.

[52] U.S. Cl.................................................. 250/83 R, 250/83.3 R
[51] Int. Cl................................................... G01t 1/24
[50] Field of Search.......................................... 250/83, 83.3, 83.3 D; 29/572; 317/235 (27)

[56] References Cited
UNITED STATES PATENTS
3,124,683 4/1964 Lorson, Jr. .................... 250/68
3,293,435 12/1966 Huth ............................ 250/83.3 R Primary Examiner—James W. Lawrence
Assistant Examiner—Morton J. Frome
Attorney—Roland A. Anderson ABSTRACT: Detector for beta particles having means for scattering particles back into the detector.

PATENTED NOV 16 1971
3,621,257
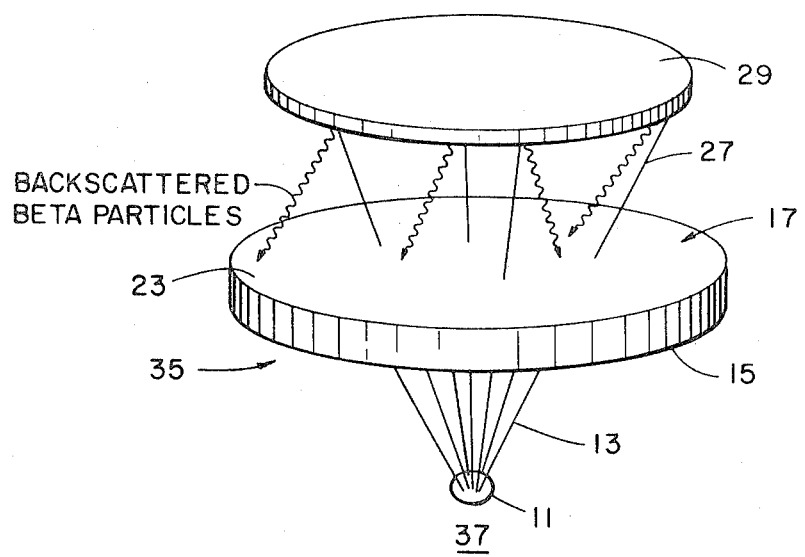
INVENTOR.
PHILLIP A. JOHNSTON
BY VINCENT L. GELEZUNAS

BETA PARTICLE DETECTION IN THIN NUCLEAR DETECTORS

BACKGROUND OF THE INVENTION

In the field of physics it is desirable to detect high-energy beta particles. Various means have been proposed and used for this purpose, such as Geiger counters, but as is well known in the art, these and the other gas counters known heretofore have required relatively thick housings for containing the gas therein, and these housings have absorbed particles that did not ionize the gas. It is additionally advantageous to provide increased beta particle detection efficiency, to reduce the need for large area detectors and complicated electronics, and to provide sensitive beta particle detection for small low-energy beta particle sources.

SUMMARY OF THE INVENTION

This invention, which was made in the course of or under a contract with the United States Atomic Energy Commission, provides a means for increasing the detection of beta particles that pass through a detector. More particularly, this invention provides a particular beta radiation source, a semiconductor diode detector having a flat side that is free of a housing, and flat means for scattering back into the detector the beta particles passing through the detector. In one embodiment, the semiconductor diode detector is a flat, wafer-shaped, semiconductor detector having a flat foil adjacent one side thereof for scattering particles into that side of the detector for the detection therein of the scattered particles. In another aspect, this invention also provides for beta particle energy discrimination for various applications. With the proper selection and arrangement of the components, as described in more detail hereinafter, the desired beta particle detection and discrimination are provided.

The above and further novel features and objects of this invention will become more apparent from the following detailed description of one embodiment when the same is read in connection with the accompanying drawing and the novel features will be particularly pointed out in the appended claims.

BRIEF DESCRIPTION OF THE DRAWING

The single FIGURE is partial three-dimensional view of the apparatus of this invention.

DESCRIPTION OF THE PREFERRED EMBODIMENTS

This invention is particular useful in the detection and/or discrimination of beta particles. Thus, as will be understood by one skilled in the art, this invention is useful in a wide variety of applications where such beta particle detection and/or energy discrimination is required. For example, the detector of this invention is useful in tracer applications, such as in the biomedical field where beta detectors are useful in catheters. Other applications, comprise industrial beta particle detection and measurements, such as are employed in gas leakage measurements. Another such application is in the quality control of the manufacture of light bulbs. Also, this invention is useful in scientific and space applications involving the evaluation of natural, geological, extraterrestrial, or manufactured materials by the use of beta particle detection. In this regard, this invention is useful to techniques such as "Kryptonation" for detection of flaws in solids. Thus, as will be understood in more detail hereinafter this invention is useful with a wide variety of radiation sources, such as $Ru^{106}$, $Kr^{85}$, $Sr^{90}$, and radiation sources of a wide variety of sizes and strengths. One description of such sources is provided in "Low Energy Radioactivity and Avalanche Detectors," and NYO 3246–TA–5, by Johnston Huth and Locker under U.S. A.E.C. Contract AT(30–1)– 3246. However, as will be understood in more detail hereinafter, the wide variety of beta particle sources used in accordance with the embodiments described herein, are limited to those whose beta particles have sufficient energy to pass through the detector.

Some beta particles deposit energy in the detector sufficient for detection and some of them do not. However, some beta particles 27 have sufficient energy to pass through the detector 17 by passing into face 15 and out side 23, and these can be detected by being deflected back into the detector. To this end, should a foil 29 be placed adjacent to the exit side of the detector, e.g. side 23, and parallel therewith in accordance with this invention, the beta particles 27 passing through the detector are scattered by foil 29 on the exit side of the detector 27 so as to pass back into the detector 17 for detection. Thus, by placing the back scatter foil 29 of this invention behind the detector on the exit side 23 of the detector away from beta source 11, there are two chances to detect any beta particles incident on the entrance face 15 of the detector closest to the source 11.

In the operation of this invention with $Ru^{106}$, beta particles 27 are scattered back into the detector 17 by a thin lead foil 29. A graph of actual results was made of the pulse height analyses of the beta particles 13 from a $Ru^{106}$ source 11 that were detected by the detector 17 alone. A 27 graph was made of the actual results of the pulse height analysis of the beta particles detected with the lead foil 29 placed over the exit side 23 of the detector 17. The result of comparison of the two graphs showed that a 30 percent increase in counting efficiency was obtained by the use of the foil 29 in an actual test. Also, in this regard, there is provided by the use of foils 29 of various atomic numbers, a simple nonelectronic means of energy discrimination of the beta particles 13 from source 11. Likewise, the distance of foil 17 from detector 17 and the thickness of foil 27 can alternately be used for purposes of control.

In one application of the described detector system 35 of this invention to rocket thruster, gas leakage detection, a small amount of a $Kr^{85}$ source 17 mixed with propellant gas confined on side 15 of detector 17 so as to lead past side 15 as an ambient 37 confined on side 15, will permit measurement leaks as low as 0.001 cm.$^3$/hr. by detecting the 667 kev. beta particles from the leaking $Kr^{85}$.

In this regard, the major work on this invention was done with a simple, flat surface, wafer-shaped, diode, semiconductor 17 that was not an avalanche multiplying detector. However, avalanche multiplying detectors 17 such as described and shown in U.S. Pat. No.3,449,177, can also be used with this invention. In this regard, in one example, high sensitivity is obtained, and low background and high detection efficiency are provided with a PN-junction diode, internally amplifying, avalanche detector 17, and the back-scattering foil 29 of this invention, which backscatters particles 27 into this detector 17.

This invention has the advantage of increasing the sensitivity of a particle detector for a wide variety of beta particle sources and applications. In one embodiment specific source, detector and scattering means are provided whereby the detector of this invention has two chances to detect beta particles incident on the entrance face of the detector. This invention also provides new and improved nonelectronic means for beta particle energy discrimination.

What is claimed is:

1. Apparatus for detecting and measuring the energy of incident, low-energy beta particles, comprising a low-energy beta source, a diode semiconductor radiation detector for receiving said beta particles, and means for scattering said beta particles back into said detector when they pass through said detector from said source, whereby said detector has high efficiency by providing two chances for the detection of said particles passing through said detector.

2. The invention of claim 1 in which said scattering means, comprises a flat lead foil for scattering back into said detector beta particles passing therethrough from a $Ru^{106}$ beta particle source.

3. The invention of claim 1 in which said detector and scattering means have adjacent flat, parallel sides on the exit side of said detector for said particles passing therethrough from said source for measuring gas leaks as low as 0.001 cm.$^3$/hr. by detecting 667 kev. beta particles from leaking gas having $Kr^{85}$ added thereto.

4. The invention of claim 1 in which said detector, comprises a PN-junction, diode internally amplifying, avalanche semiconductor detector having flat, uncluttered opposite sides, and said scattering means is a flat foil spaced from and parallel with one side of said detector with said detector interposed between said source and foil.

5. The invention of claim 1 in which said means for scattering beta particles back into said detector is a foil having a predetermined atomic number for selectively providing for energy discrimination of the beta particles from said source.

* * * * *